US009821671B2

(12) United States Patent
Mueller et al.

(10) Patent No.: US 9,821,671 B2
(45) Date of Patent: Nov. 21, 2017

(54) WALL PLUG SYSTEM FOR ELECTRIC VEHICLE

(71) Applicant: Lear Corporation, Southfield, MI (US)

(72) Inventors: Mark Anthony Mueller, Fenton, MI (US); David A. Hein, Sterling Heights, MI (US); David Menzies, Linden, MI (US); Reinhard Pusch, Farmington Hills, MI (US); Mary Mueller, Fenton, MI (US)

(73) Assignee: Lear Corporation, Southfield, MI (US)

( * ) Notice: Subject to any disclaimer, the term of this patent is extended or adjusted under 35 U.S.C. 154(b) by 37 days.

(21) Appl. No.: 14/607,767

(22) Filed: Jan. 28, 2015

(65) Prior Publication Data

US 2015/0251551 A1    Sep. 10, 2015

Related U.S. Application Data

(60) Provisional application No. 61/947,791, filed on Mar. 4, 2014.

(51) Int. Cl.
*H02J 7/00* (2006.01)
*B60L 11/18* (2006.01)
(Continued)

(52) U.S. Cl.
CPC ......... *B60L 11/1818* (2013.01); *B60L 3/0069* (2013.01); *B60L 11/005* (2013.01);
(Continued)

(58) Field of Classification Search
CPC ..................................................... Y02T 90/14
USPC .......................................................... 320/109
See application file for complete search history.

(56) References Cited

U.S. PATENT DOCUMENTS 4,575,704 A * 3/1986 Pezold .................. H01R 13/68
337/197
6,595,782 B1 7/2003 Hsiao
(Continued)

FOREIGN PATENT DOCUMENTS

CN       101989718 A     3/2011
CN       102651526 A     8/2012
(Continued)

OTHER PUBLICATIONS

Chinese Office Action dated Nov. 2, 2016 for Chinese Application No. 201510096357.9, 7 pgs.

*Primary Examiner* — Suresh Memula
(74) *Attorney, Agent, or Firm* — Brooks Kushman P.C.

(57) ABSTRACT

An electric vehicle charging system in described that includes an electrical energy source that includes a base with a plurality of electrical signal connectors to receive a first electrical signal, a second electrical signal and a ground signal, an adapter having a plurality of outlet connectors configured to electrically connect to at least some of the plurality of electrical signal connectors, wherein the adapter can be placed in a plurality of positions on the base to correctly orient the base to any of plurality of outlet connector orientations, and a locking ring adapted to engage the base to removable fix the adapter to the base in one of the four positions. The system can include a thermistor assembly to sense thermal energy in the source and if thermal energy exceeds a threshold to output a signal. The system can include a charging cord for an electric vehicle having a proper orientation when engaging the source, wherein the adapter is in a correct orientation with the base being in the proper orientation when connected to the socket-outlet.

20 Claims, 8 Drawing Sheets

(51) Int. Cl.
*B60L 3/00* (2006.01)
*B60L 11/00* (2006.01)

(52) U.S. Cl.
CPC ....... *B60L 11/1824* (2013.01); *B60L 2200/12* (2013.01); *B60L 2200/36* (2013.01); *B60L 2230/12* (2013.01); *B60L 2240/36* (2013.01); *B60L 2240/547* (2013.01); *B60L 2240/549* (2013.01); *B60L 2240/80* (2013.01); *Y02T 10/7005* (2013.01); *Y02T 10/7022* (2013.01); *Y02T 10/7088* (2013.01); *Y02T 90/121* (2013.01); *Y02T 90/14* (2013.01)

(56) References Cited

U.S. PATENT DOCUMENTS

| | | |
|---|---|---|
| 7,168,969 B1 | 1/2007 | Wang |
| 7,435,091 B1 | 10/2008 | Cruz |
| 7,575,436 B1 | 8/2009 | Devlin et al. |
| 7,740,484 B1 | 6/2010 | Chiang |
| 8,079,877 B1 | 12/2011 | Lai et al. |
| 8,313,335 B2 | 11/2012 | Wu |
| 8,500,492 B2 | 8/2013 | Brown et al. |
| 2002/0055288 A1* | 5/2002 | Philips ................. H01R 31/065 439/170 |
| 2011/0059623 A1* | 3/2011 | Capece ............... H01R 13/7037 439/39 |
| 2011/0300753 A1* | 12/2011 | Ichikawa ............. B60L 3/0069 439/620.21 |
| 2013/0017705 A1 | 1/2013 | Lai et al. |
| 2013/0288490 A1 | 10/2013 | Hsu |

FOREIGN PATENT DOCUMENTS

| | | |
|---|---|---|
| CN | 202363713 U | 8/2012 |
| CN | 102957023 A | 3/2013 |
| KR | 20110053046 A | 5/2011 |

* cited by examiner

WALL PLUG SYSTEM FOR ELECTRIC VEHICLE

CROSS-REFERENCE TO RELATED APPLICATIONS

The present U.S. Utility Patent Application claims priority pursuant to 35 U.S.C. §119(e) to the U.S. Provisional Patent Application 61/947,791, filed Mar. 4, 2014, which is hereby incorporated herein by reference in its entirety and made part of the present U.S. Utility Patent Application for all purposes.

TECHNICAL FIELD

Embodiments of the present disclosure generally provide for a wall plug to provide electrical power to a device through a cord connectable to the wall plug and, more specifically, to a wall plug system for use with electrical vehicle supply equipment.

BACKGROUND

Electrical outlets can be in mounted in many different orientations on a wall. Electric vehicle supply equipment (EVSE) connects the vehicle electrical system to an external electrical energy source, e.g., a household or an electrical grid, through an electrical outlet. When in certain orientations, EVSE can cause undesired stress on the outlet, on the cord or on other components. Such stress may cause electrical failure of the outlet or cord. In some orientations the EVSE can undesirably disconnect, electrically or mechanically, from the outlet.

BRIEF DESCRIPTION OF THE DRAWINGS

The embodiments of the present disclosure are pointed out with particularity. However, other features of the various embodiments will become more apparent and will be best understood by referring to the following detailed description in conjunction with the accompanying drawings in which.

DETAILED DESCRIPTION

As required, detailed examples of the present invention are disclosed herein; however, it is to be understood that the disclosed examples are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figures 1, 2, 3, 4:
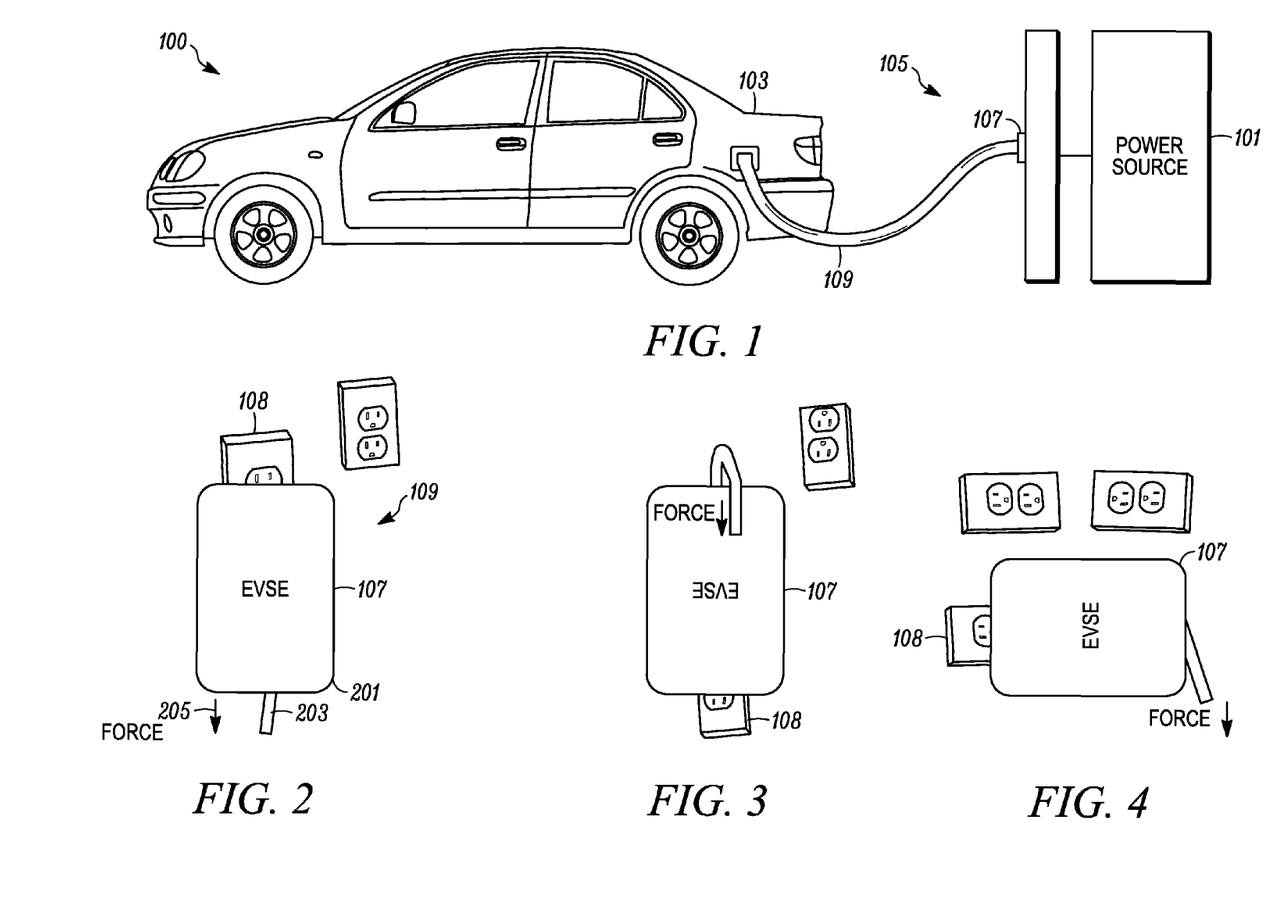
FIG. 1 depicts an electrical charging system.
FIG. 2 depicts a normally-oriented outlet with a cord connected thereto.
FIG. 3 depicts an 180 degree from normal-oriented outlet with a cord connected thereto.
FIG. 4 depicts a 90 degree from normal-oriented outlet with a cord connected thereto.

FIG. 1 depicts an electrical charging system 100 that can deliver power from a source 101 to a device 103 to be charged, here, shown as a vehicle. The vehicle can be an automobile, a motorcycle, a truck or other conveyance. In an example, the vehicle is a hybrid electric vehicle, a plug-in electric vehicle or an all-electric vehicle. The device 103 can be any device that includes rechargeable energy storage, e.g. a battery or capacitor. The device 103 can accept usual household or residential voltages. Electrical charge supply equipment 105 connects the power source 101 to device 103. Equipment 105 can include wiring in a wall or building, an EVSE box 107 and a cord 109 extending from the EVSE box 107 to the vehicle. Due to the power used to charge the device 103, which can be at 120 volts or 240 volts, the cord 109 can have significant weight. Other voltages, e.g., 230V or 460V can be used with the present disclosure. The equipment 105 can also include additional physical sensor wires to provide a feedback signal such as specified by the vehicle charging standards, such as SAE J1772 and IEC 61851 or GB/T China Standards, that require special output (multi-pin) power plug fittings. Current sensors which monitor the power consumed, and only maintain the connection if the demand is within a predetermined range. Sensor wires react more quickly, have fewer parts to fail and may be cost effective. Current sensors however can use standard connectors and can readily provide an option for suppliers to monitor or charge for the electricity actually consumed by the device being charged.

The electrical charging system 100 can be configured to provide various modes of charging for the device 103. The first mode can be a household configuration that uses a household socket and extension cord. The socket can be a fixed, non-dedicated electrical socket. The vehicle's electrical system can be connected to the utility power grid through standard socket-outlets present in residences, which depending on the country are usually rated at around 10-15 amps, up to 16 amps in some jurisdictions. To use mode 1, the electrical installation of the cord must comply with the safety regulations and must have an earth ground system, a circuit breaker to protect against overload and an earth leakage protection. The sockets can have blanking devices to prevent accidental contacts. This system cannot monitor the available power, to avoid risks of heating of the socket and cables following intensive use for several hours at or near the maximum power (which varies from 8 to 16 amps depending on the country) to reduce fire or electric injury risks if the electrical installation is obsolete or if certain protective devices are absent. In this mode, another limitation is related to the installation's power management as the charging socket shares a feed from the switchboard with other sockets (no dedicated circuit) if the sum of consumptions exceeds the protection limit (in general 15 or 20 Amp), the circuit-breaker will trip, stopping the charging. All these factors impose a limit on the power in mode 1, for safety and service quality reasons. This limit is currently being defined, and the value of 10 A appears to be the best compromise.

A second mode for the charging system 100 can include a residential electrical-socket plug and a cable with a charge circuit interrupting device located in an in-line cable control box (ICCB). The socket outlet may or may not be on an electrical circuit dedicated to the charging system. Like mode 1, the vehicle is connected to the main or utility power grid via household (e.g., residential) socket-outlets. Charging is done via a single-phase or three-phase network and installation of an earthing cable (e.g., a TN network). The present system can also work on a TT electricity supply network or an IT electricity supply network. A protection device is built into the cable. This mode is more expensive than the first model due to the specificity of the cable. This mode can be used with the end-cable box 107 and cable 109 to charge a device as described herein.

A third mode for the charging system 100 can include a dedicated socket on a dedicated circuit. The vehicle 103 can be connected directly to the electrical power source through the specific socket and plug (which can be the box 107) and a dedicated circuit. A control and protection circuitry is installed permanently in the system 100, for example in the box 107. This is a charging mode that meets many standards regulating electrical installations. The control and protection circuitry can also allow other electrical household appliances to be operated during vehicle charging or can optimize the electric vehicle charging time.

A fourth mode for the charging system 100 includes a direct current (DC) connection for fast recharging of the vehicle 103. This connection electrically connects the electric vehicle to the main power grid through a dedicated charger. Control and protection functions and the vehicle charging cable are installed permanently in the installation of the system 100.

FIGS. 2-4 depicts various orientations of an electrical outlet and the connections of the charging cord to the outlets. FIG. 2 shows a standard orientation of a North American alternating current outlet 108 with the Line and Neutral blade receptacles side-by-side on top with the ground pin receptacle on the bottom. The cord 109 includes a plug 201, typically at one end of a wire 203. The plug 201 mechanically and electrically connects to the wall outlet 108. In this illustrated example, the plug 201 has blades and pins to engage the receptacles in the outlet 108. The plug 201 and wire 203 are fixed together and have an orientation that is designed to reduce the effects of the weight of the wire 203 on the plug 201, the outlet 108 and the wire 203 itself. As shown in FIG. 2, the plug 201 is engaged with the outlet 108 with the wire 203 extending downwardly from the plug 201. As a result, the wire 203 exerts a force downwardly as indicated by arrow 205. For clarity, the orientation of the outlet 108 is shown adjacent to the plug 201.

FIGS. 3 and 4 show undesirable orientations of the plug 201 with the North American outlet being the illustrated example. In FIG. 3 the socket 108 is mounted upside down, e.g., rotated 180 degrees relative to the FIG. 2 example. The cord 109 extends out of the top of the plug 201 and curves back on itself under the force of gravity. The weight of the wire 203 this places a force on the plug 201 which may pivot the plug 201 out of the socket 108 or place force (arrow 206) on the connection of the plug 201 to the socket 108. In FIG. 4 the socket 108 is mounted at a position pivoted 90 degrees from either the FIG. 2 example or FIG. 3 example. The weight of the wire 203 places a force (arrow 207) on the plug 201 which may pivot the plug 201 out of the socket 108 or place force on the connection of the plug 201 to the socket 108. The FIGS. 3 and 4 examples both force the wire to bend undesirably (180 degrees or 90 degrees) which may cause a failure in the wire or place an undesirable force on the outlet or connection between the plug and the outlet.

While FIGS. 2-4 show a North American electrical outlet, it will be appreciated that other worldwide outlets may also be oriented in non-standard orientations that will cause the mechanical stress on the charging system. Examples of electrical connectors include Japanese sockets and plugs, continental European sockets and plugs, UK sockets and plugs, Chinese sockets and plugs or any other country specific socket and plug.

The examples shown in FIGS. 2-4 are the orientation of a fixed position plug and a fixed position socket (i.e., electrical receptacles). The inventors of the present patent application have determined a need for a plug that can be oriented as needed for proper orientation of the charging devices, e.g., an EVSE with the inventive structures as described herein.

Figure 5A:
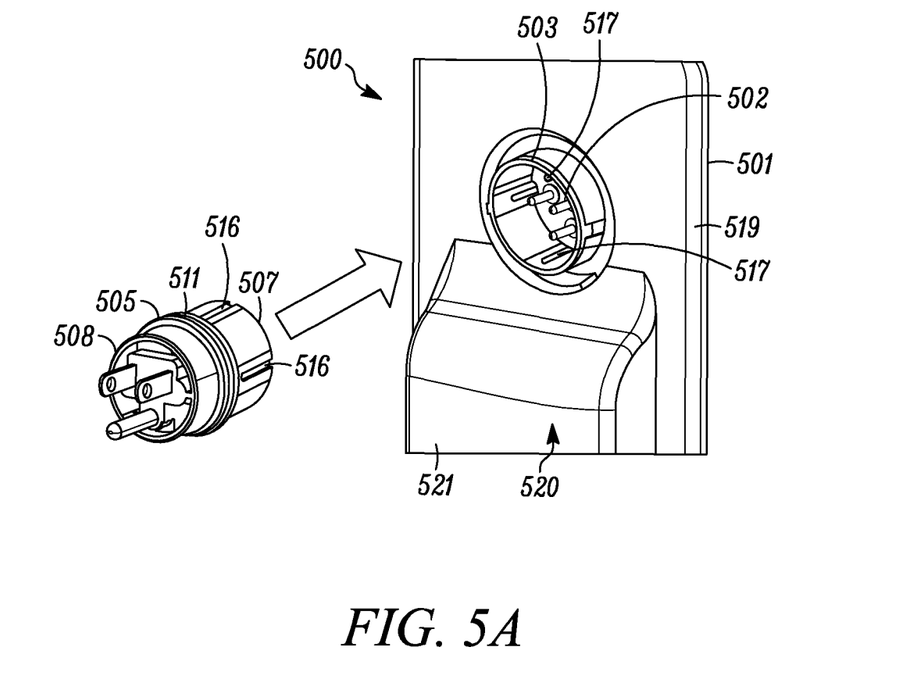
FIGS. 5A-5C depicts assembling the wall adaptor into the EVSE enclosure socket according to an embodiment.
Figure 5B:
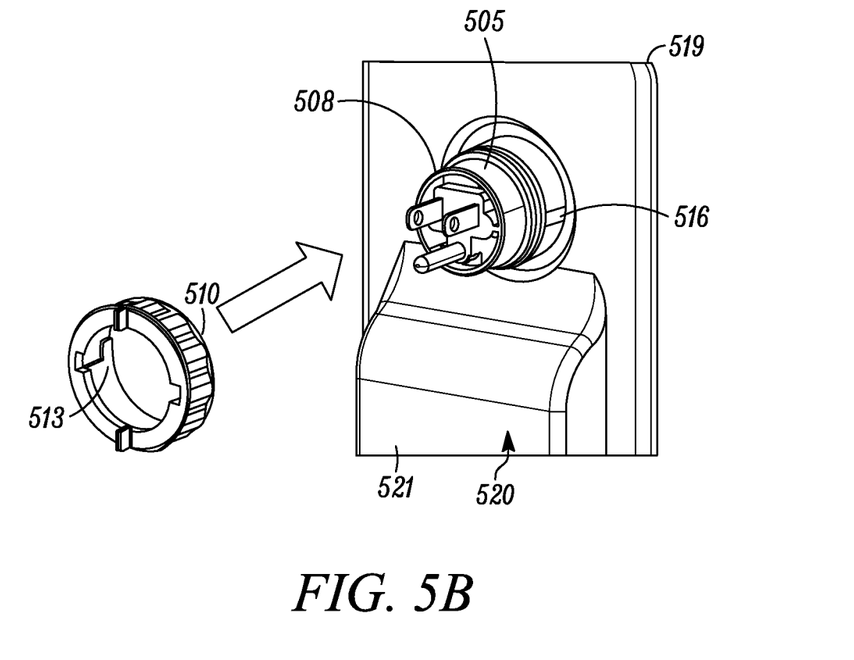
Figure 5C:
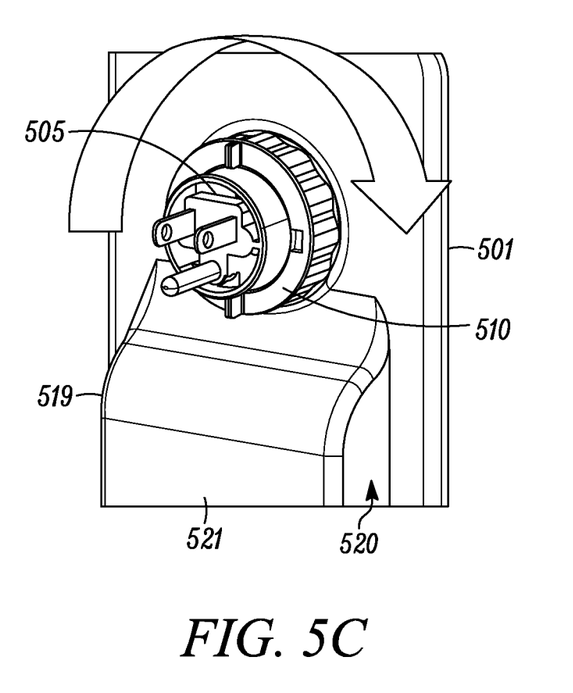
Figure 6A:
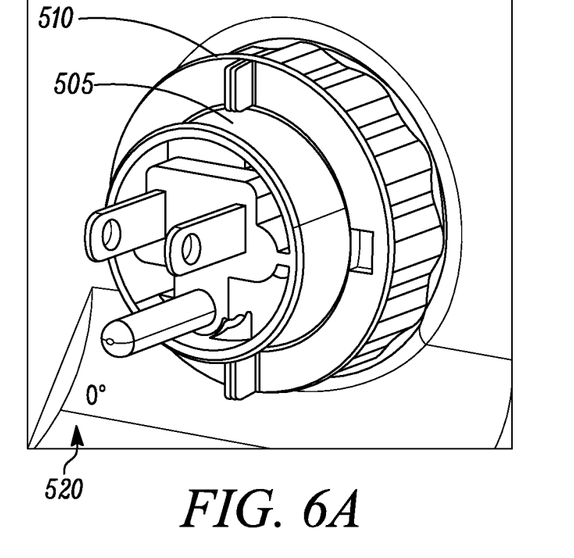
FIGS. 6A-6D depicts orientations of the wall adaptor according to an embodiment.
Figure 6B:
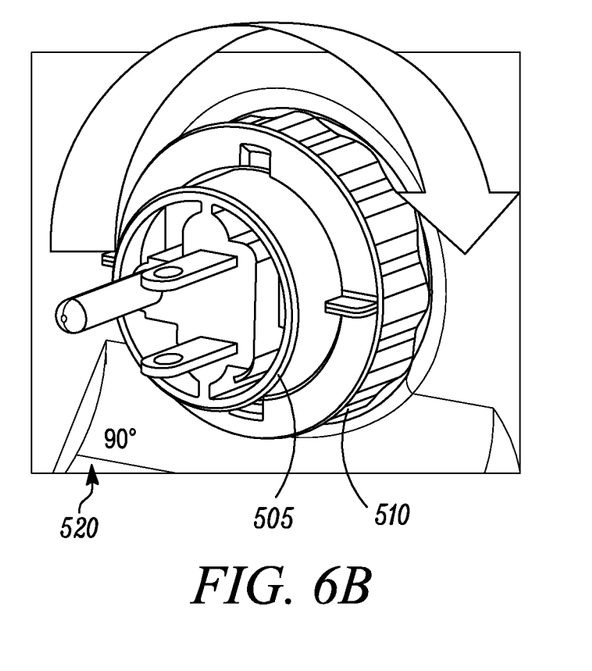
Figure 6C:
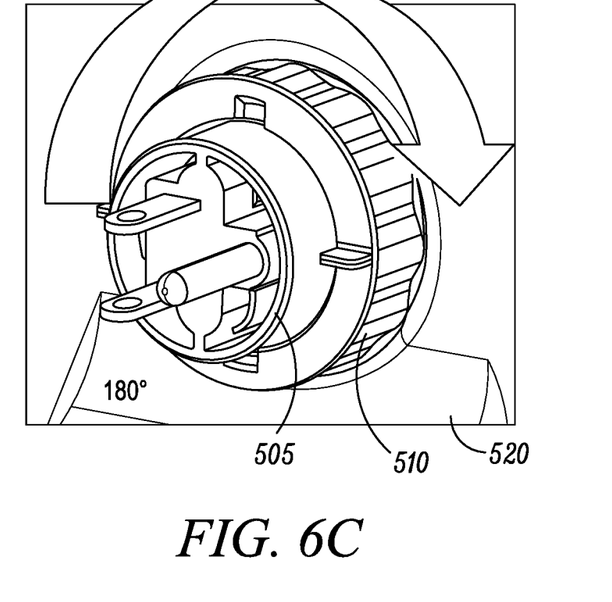
Figure 6D:
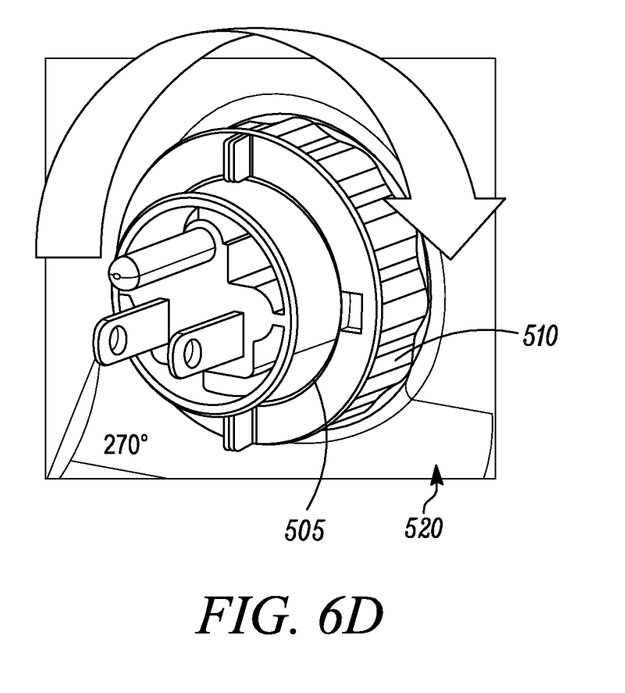

FIGS. 5A-5C depict the assembly 500 of a wall adaptor 505 to the cable control box 501 for use in an electrical charging system 100. The cable control box can also have charging circuit interrupt device (CCID) that can stop charging of the vehicle and electrical energy flow to the cable. The cable control box 501 that is attached to the end of a cable 203 has a recess 502 designed to accept the wall adaptor 505. A plurality of wall adaptors 505, which are individually adapted for receipt in different electrical sockets, can be positioned in the recess 502. A North American wall adapter 505 is shown in FIGS. 5A-5C. The wall adapter 505 is configured to transmit electrical signals from a source, e.g., a power grid, to another conductor. The wall adapter 505 mates with the base 501. The wall adapter 505 includes a plurality of electrical connectors that are adapted to transmit electrical signals from the power source 101 through the adapter 505 to the connectors in the base 501. The base 501 is connected to a cable that is in turn connected to the device to be charged. The adapter 505 has a distal end 507 that is received in the base recess 502 with the electrical connectors of both the adapter and the base being electrically connected. The adapter 505 has a proximal end 508 that extends outwardly from the recess (FIGS. 5B and 5C) and includes a plurality of electrical connectors which enable this assembly to plug into standard socket outlets (here shown as North American). The base 501 and adapter 505 can be aligned using channels 516 and protuberances 517, respectively, which mate to position the adapter 505 in the base recess 502. The channels and protuberances can be positioned vice versa on the recess and adapter distal end 507.

A locking ring 510 can engage the base 501 and secure the adapter 505 to the base 501. The outer periphery of the base 501 can have threads that matingly engage internal threads on the locking ring 510. The base 501 can also have locking channels that receive a male part from the locking ring to secure the adapter 505 to the recess. The adapter 505 has an annular ridge 511 intermediate the proximal end and the distal end. The ridge 511 extends outwardly to an extent that is greater than the base recess 502. The locking ring 510 has an inwardly extending wall 513 that engages the ridge 511 when the locking ring mounts the adapter 505 to the base 501 (FIG. 5C). A sealing structure can be adjacent the ridge 511 and seals the environment from entering the joined volume between the adapter 505 and base recess 503.

The base 501 includes a sealed housing 519 in which electrical wires, circuitry and connections can be mounted. Housing 519 generally has a regular prism shape with a projection 520 extending outwardly from the face of the housing that includes the recess. The projection 520 has a face 521 that is essentially flat and parallel to the remainder of the side of the housing in which the recess 505 is formed. The projection 520 has a height, i.e., its face 521 relative to the surface of the main housing, which is essentially co-planar with the face of the proximal end 508 of the adapter 505. Thus with wall adapter 505 inserted into the receptacle or socket to make electrical connection to the power source, the face 521 will contact the wall beneath the socket. This will help reduce the mechanical stress on the blade and pin connection in the receptacle. This also improves reliability of the electrical connections, which could also help to keep a suitable electrical connection with resistance in an acceptable range, which may help keep heating down to an acceptable level.

FIGS. 6A-6D show orientations of the wall adapter for use in the electrical charging system 100. The first orientation as shown on FIG. 6A has the adapter in a standard orientation with the earth pin toward the bottom and the line 1 and line 2/neutral blades horizontally aligned above the earth pin. Bottom as shown in FIGS. 6A-6D is toward the projection 520, which when the assembly is connected to an outlet, is downward from the receptacle. The second orientation as shown on FIG. 6B has the adapter 505 rotated 90 degrees clockwise relative to the first orientation with the earth pin on the left and the line 1 and line 2/neutral blades vertically aligned to the right of the earth pin. The third orientation as shown on FIG. 6C has the adapter rotated 90 degrees counterclockwise relative to the first orientation with the earth pin on the right and the line 1 and line 2/neutral blades vertically aligned to the left of the earth pin. The fourth orientation as shown on FIG. 6D has the adapter in an upside down orientation relative to the first orientation with the earth pin at the top and the line 1 and line 2/neutral blades horizontally aligned below the earth pin. These four orientations allow the adapter 505 to be positioned relative to the base as shown in FIGS. 6A-6D so that the electrical connectors, e.g., pin and blades, are orientated so that when the ICCB is connected to the socket-outlet it is in the proper orientation to put the least stress on the cord and/or the outlet. In an example, the adapter 505 allows the cord to be in the orientation as shown in FIG. 2 and not in either of orientations as shown in FIGS. 3 and 4.

Figure 7:
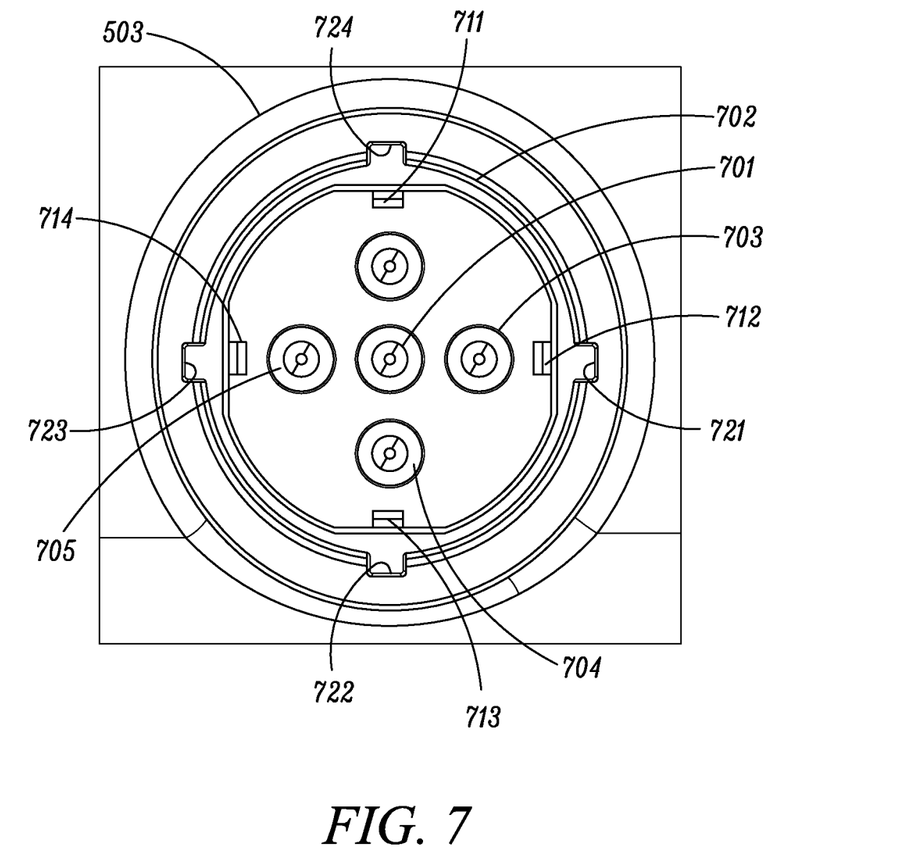
FIG. 7 depicts an elevational view of an EVSE socket.

FIG. 7 shows a view of the recess 503 of the adapter 505 electrical connectors 701-705 that allow for the adapter 505 to be positioned in any of the four orientations and provide the correct electrical signals to be output from the power source to the vehicle through the adapter (with ICCB) 500 and cord or wire. The electrical connectors 701-705 are shown as male connectors, e.g., pins, that extend from the closed end of the base recess 503 into the recess. The electrical connectors 701-705 are arrayed in a cross configuration. The electrical connectors 701-705 are positioned so that one earth pin, one Neutral/Line 2 pin and one Line 1 pin are connected to respective ones of the electrical terminals in the adapter 505. The earth electrical connector 701 is positioned in the center of the recess. In an example, the earth electrical connector 701 is the only earth connector and is connected to the adapter in all orientations of the adapter relative to the base. The Line 1 electrical connectors 702 and 703 are positioned adjacent each other and define two arms of the cross configuration. As shown in FIG. 7, one Line 1 electrical connector 702 is positioned at the top of the cross configuration and one Line 1 electrical connector 703 is positioned at the right arm of the cross configuration. The Neutral/Line 2 electrical connectors 704 and 705 are positioned adjacent each other and define two arms of the cross configuration. As shown in FIG. 7, one Neutral/Line 2 electrical connector 704 is positioned at the bottom of the cross configuration and one Neutral/Line 2 electrical connector 705 is positioned at the left arm of the cross configuration. Only one of the Line 1 electrical connections 702, 703 and one of the Neutral/Line 2 electrical connections 704, 705 are electrically connected to the adapter 505 in any of the four orientations of the adapter. The non-connected connectors are received in a body of the adapter 505 but are not electrically connected and in some embodiments are not mechanically connected to the adapter.

The recess 503 further includes keyholes 721-724 that are adapted to receive alignment keys positioned on the outer part of the distal end 507 of the adapter 505. The keyholes 721-724 are positioned to be aligned at each of the ends defined by the cross position of the connectors 701-705. In an example, the keyholes 721, 723 are horizontally aligned. The keyholes 722, 724 are vertically aligned. The keyholes 721-724 are positioned so that when they receive keys that are on the adapter 505, the adapter is aligned with the connectors and can only be inserted in the recess in one of the four orthogonal positions.

The electrical charging system can further include a thermistor assembly 800 to sense the heat in the adapter 505 and base 501. Four thermistor contacts 711-714 are positioned in the base 501. In the illustrated example, there are four orthogonally positioned thermistor contacts 711-714, which can be linearly aligned with the arms of the base electrical contacts 701-705. The thermistor contacts 711-714 are electrically connected to circuitry in the base 503.

Figure 8:
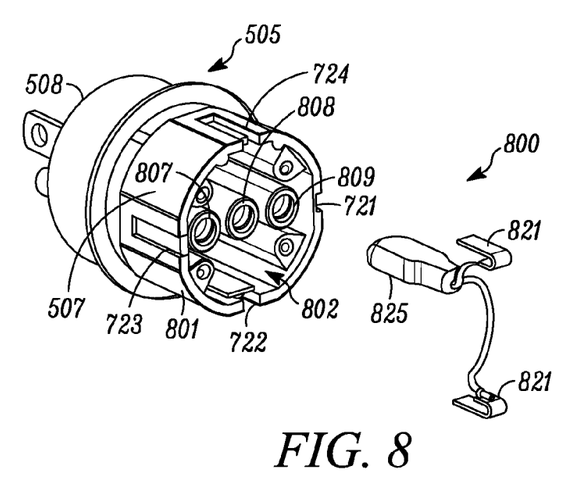
FIG. 8 depicts an exploded view of a wall adapter.

FIG. 8 shows an exploded view of part of the thermistor assembly 800 and the adapter 505 with the distal end 507 being in the foreground. The adapter distal end 507 includes a wall 801 that defines a recess 802 in which are positioned a plurality of electrical terminals 807, 808, and 809. The electrical terminals 807, 808, and 809 are aligned in a row with the center terminal 808 being the ground connection that connects to the ground pin. The left terminal 807 is connected to one of the blades. The right terminal 809 is the neutral/line 2 electrical terminal that is connected to one of the blades. The electrical connectors 807-809 are shown as female terminals that receive respective pins of the base connectors.

The thermistor assembly 800 includes thermistor contacts 821 that mechanically and electrically contact at least two of the thermistor contacts 711-714 in the base 503. The thermistor sensor 825 is positioned intermediate the thermistor contacts 821. In an example, the thermistor sensor 825 is a negative temperature coefficient (NTC) thermistor that decreases in resistance with increasing temperature, thus the resistance between the contacts 821 decreases as the temperature in the adapter 505 at the base increases.

Figure 9:
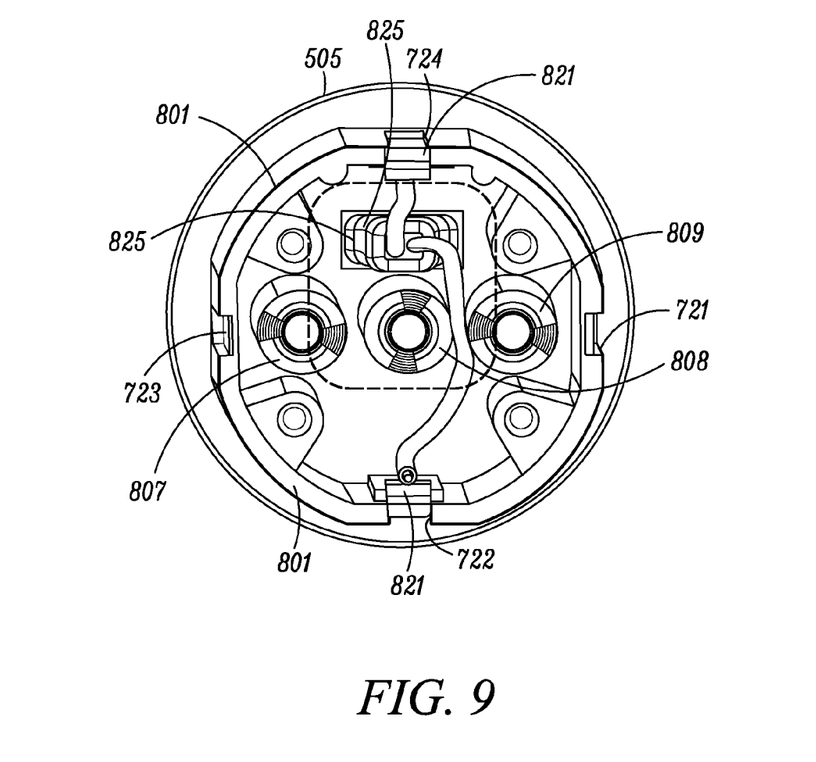
FIG. 9 depicts an elevational view of a wall adapter.

FIG. 9 shows an elevational view of the distal end of the adapter 505. The thermistor sensor 825 is received in a further recess in the closed end of the adapter recess 502 with electrically conductive wires extending therefrom to two of the thermistor contacts 711-714, which in turn communicate the change in resistance to external circuitry to sense the thermal energy in the adapter and act as a safety mechanism that can turn off the electrical charging signal or reduce the duty cycle of the electrical charging signal if a thermal limit is reached as sensed by the thermistor assembly.

Various embodiments of an electrical outlet for charging a device are described herein and can include a base with a plurality of electrical signal connectors to communicate a first electrical signal, a second electrical signal and a neutral signal, an adapter having a plurality of outlet connectors configured to electrically connect to at least some of the plurality of electrical signal connectors, wherein the adapter can be placed in at least four positions on the base to correctly orient the plurality of outlet connectors to properly plug into a socket outlet, and a locking ring adapted to engage the base to fix the removeable wall adapter to the base in one of the four positions.

The plurality of connectors of the base can include five connectors with first and second connectors of the five connectors being adapted to deliver the first electrical signal, third and fourth connectors the five connectors being adapted to deliver the second electrical signal and a fifth connector the five connectors being adapted to connect to earth. In an embodiment, the five connectors are positioned in a cross pattern with the fifth connector being in a center of the cross pattern, the first and second connectors being adjacent each other and the third and fourth connectors being adjacent each other. In an embodiment, the first connector and the third connector can be on opposite sides of the fifth connector and the second connector and the fourth connector can be on opposite sides of the fifth connector. In an embodiment, the adapter includes a first line connector, a second line connector and a ground connector that are configured to connect to three of the five connectors, wherein the first line connector, the second line connector and the ground connector being oriented linearly with the ground line in the center to connect to the fifth connector with the adapter in any of the four positions on the base. In an embodiment, the first line connector and the second line connector connect to opposite electrical polarity in any of the four positions on the base.

Various embodiments can also include a thermistor assembly to sense thermal energy in the wall adaptor, wherein the thermistor assembly being connected to the base, through the adapter or both. The thermistor assembly can include a thermistor positioned in the adapter and common terminals on both the adapter and the base.

The base can include a recess in which the plurality of connectors is positioned and is adapted to at least partially receive the adapter.

In various embodiments, the base and the adapter are both free from sliding contacts.

Electrical outlets can be mounted in many different orientations. Electric vehicle supply equipment (EVSE) connects the vehicle electrical system to an external electrical energy source, e.g., a household socket-outlet or an electrical grid. When in certain orientations, EVSE can cause undesired stress on the outlet, the plug, the cord or on other components. In some orientations the EVSE can disconnect, electrically or mechanically from the outlet. These outlets can also be rotated to any one of the four orientations, e.g., orthogonal orientations, and held in place by the lock ring. The present construction provides an integrated wall plug with cord set that is able to rotate 360 degrees in 90 increments. It also has a built-in Thermal Sensor (NTC).

The present construction is removeable and replaceable with a variety of international outlets and international plugs. While shown with North American outlets, it will be understood that the wall adaptor can be adapted to work with other outlets, i.e., all international configurations, e.g., European outlets, UK outlets, Japanese outlets, Chinese outlets, German outlets, and the like.

The outlet is rotatable to conform to any wall electrical outlet orientation. The present construction can also have an integrated thermal sensor. In some charging configurations, high power round terminals are used. The round terminals are also believed to be able to handle up to 70 amps (depending on wire size) and durable to more than 10,000 cycles. The pin placement allows for a common ground and dual power pickup in any of the four orientations.

Mating assemblies between the plug and the enclosure assist with aligning the plug in the desired orientation relative to the electrical outlet. The lock ring engages the enclosure to hold the plug in place on the enclosure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

We claim:

1. An EVSE cord end comprising:
    a base with a plurality of electrical signal connectors to communicate a first electrical signal, a second electrical signal and a neutral signal to a vehicle;
    an adapter having a plurality of outlet connectors configured to electrically connect to at least some of the plurality of electrical signal connectors to the base, wherein the adapter includes at least four positions on the base, wherein one position of the at least four positions corresponds to a socket-outlet that supplies the first electrical signal, the second electrical signal and the neutral signal through the plurality of outlet connectors to the plurality of electrical signal connectors with the one position being selected to an orientation of the plurality of outlet connectors to match orientation of the socket-outlet to plug the outlet connectors into the socket-outlet; and
    a locking ring engaging the base to removably fix the adapter to the base in one of the four positions at the orientation of the plurality of outlet connectors.

2. The cord end of claim 1, wherein the plurality of outlet connectors includes five connectors with first and second connectors of the five connectors being adapted to deliver the first electrical signal, third and fourth connectors the five connectors being adapted to deliver the second electrical signal and a fifth connector the five connectors being adapted to connect to earth.

3. The cord end of claim 2, wherein the five connectors are positioned in a cross pattern with the fifth connector being in a center of the cross pattern, the first and second connectors being adjacent each other and the third and fourth connectors being adjacent each other.

4. The cord end of claim 3, wherein the first connector and the third connector being on opposite sides of the fifth connector and the second connector and the fourth connector being on opposite sides of the fifth connector.

5. The cord end of claim 4, wherein the adapter includes a first line connector, a second line connector and a ground connector that are configured to connect to three of the five connectors, wherein the first line connector, the second line connector and the ground connector being oriented linearly with the ground line in the center to connect to the fifth connector with the adapter in any of the four positions on the base.

6. The cord end of claim 5, wherein the first line connector and the second line connector connect to opposite electrical polarity in any of the four positions on the base.

7. The cord end of claim 5, further comprising a thermistor assembly to sense thermal energy in the outlet, wherein the thermistor assembly being connected to the base, through the adapter or both.

8. The cord end of claim 7, wherein the thermistor assembly includes a thermistor positioned on the adapter and common terminals on both the adapter and the base.

9. The cord end of claim 1, wherein the base includes a recess in which the plurality of connectors are positioned and is adapted to at least partially receive the adapter.

10. The cord end of claim 1, wherein the base and the adapter are both free from sliding contacts.

11. An electric vehicle charging system comprising:
a source including:
a base with a plurality of electrical signal connectors to receive a first electrical signal, a second electrical signal and a ground signal from a wall adaptor plug;
an adapter having a plurality of outlet connectors configured to electrically connect to at least some of the plurality of electrical signal connectors, wherein the adapter can be placed in a plurality of positions on the base to match orientation of the plurality of outlet connectors; and
a locking ring adapted to engage the base to removeably fix the adapter to the base in one of the plurality of positions, wherein the plurality of positions are at least four positions;
a thermistor assembly to sense thermal energy in the source at the base and if thermal energy exceeds a threshold to output a signal to indicate thermal energy exceeds the threshold outside the source; and
a charging cord for an electric vehicle having a proper orientation when engaging the source, wherein the adapter is connected to the adapter and is in matching orientation with a socket-outlet.

12. The system of claim 11, wherein the thermistor assembly is on the adapter and electrically connected to the base through electrical contacts.

13. The system of claim 11, wherein the base includes a recess in which the plurality of connectors are positioned and is adapted to at least partially receive the adapter.

14. The system of claim 11, wherein the base includes a recess in which the plurality of connectors are positioned and is adapted to at least partially receive the adapter.

15. The system of claim 11, wherein the base and the adapter are both free from sliding contacts.

16. The system of claim 11, wherein electrical signal connectors outnumber the outlet connectors.

17. The system of claim 11, wherein electrical signal connectors are pins and the outlet connectors include sockets adapted to receive the pins and outwardly extending blades to engage the household socket-outlet.

18. A method of using electric vehicle supply equipment comprising:
orienting a wall-plug adapter such that an EVSE housing is oriented with a cord end facing downward, wherein the housing provides up to four orthogonal positions;
joining the adapter into the housing to make electrical contact with a plurality of electrical signal connectors to communicate electrical charging signals to a vehicle, wherein the adapter is electrically connected to a power source in any of the positions of the adapter on the housing;
locking the adapter to the housing;
connecting the adapter to a socket-outlet; and
partially supporting the housing by the housing contacting a fixture fixed below the socket-outlet.

19. The method of claim 18, further comprising changing orientation of the wall-plug adapter relative to the housing by undoing a lock, removing the adapter, rotating the adapter, joining the adapter to the housing to make proper electrical connection and re-locking the adapter to the housing.

20. The method of claim 19, wherein joining includes mechanically connecting the adapter to the housing and electrically connecting connectors in the adapter to only some of the electrical connectors in the housing; and sensing thermal energy in the adapter and communicating the sensed thermal energy to circuitry in the electric vehicle supply equipment to control vehicle charging if a thermal threshold is exceeded.

* * * * *

UNITED STATES PATENT AND TRADEMARK OFFICE
CERTIFICATE OF CORRECTION

PATENT NO. : 9,821,671 B2  
APPLICATION NO. : 14/607767  
DATED : November 21, 2017  
INVENTOR(S) : Mark Anthony Mueller et al.

Page 1 of 1

It is certified that error appears in the above-identified patent and that said Letters Patent is hereby corrected as shown below:

In the Claims

Column 8, Line 34, Claim 2:
After "third and fourth connectors"
Insert -- of --.

Column 8, Line 36, Claim 2:
After "third and fourth connectors"
Insert -- of --.

Signed and Sealed this
Sixth Day of March, 2018

Andrei Iancu
*Director of the United States Patent and Trademark Office*